(12) United States Patent
Uchimoto et al.

(10) Patent No.: US 8,598,800 B2
(45) Date of Patent: Dec. 3, 2013

(54) CONTROL CIRCUIT FOR SWITCHING POWER SUPPLY

(75) Inventors: Daisuke Uchimoto, Kyoto (JP); Hiroki Kikuchi, Kyoto (JP); Naoki Inoue, Kyoto (JP)

(73) Assignee: Rohm Co., Ltd. (JP)

( * ) Notice: Subject to any disclaimer, the term of this patent is extended or adjusted under 35 U.S.C. 154(b) by 253 days.

(21) Appl. No.: 13/089,741

(22) Filed: Apr. 19, 2011

(65) Prior Publication Data

US 2011/0279045 A1    Nov. 17, 2011

(30) Foreign Application Priority Data

Apr. 23, 2010    (JP) .................................. 2010-100233

(51) Int. Cl.
*H05B 41/36* (2006.01)
*G05F 1/00* (2006.01)
*G05F 1/10* (2006.01)

(52) U.S. Cl.
USPC ......... 315/247; 315/222; 315/209 R; 323/238

(58) Field of Classification Search
USPC ................ 315/247, 297, 312, 320, 257, 291, 315/209 R, 222; 345/82; 323/238, 282, 284, 323/285; 361/18
See application file for complete search history.

(56) References Cited

U.S. PATENT DOCUMENTS

| | | | | |
|---|---|---|---|---|
| 7,301,312 | B2* | 11/2007 | Nishino | 323/222 |
| 7,471,070 | B2* | 12/2008 | Nishino | 323/222 |
| 7,579,784 | B2* | 8/2009 | Araki et al. | 315/209 R |
| 7,633,274 | B2* | 12/2009 | Nishino | 323/222 |
| 2008/0136341 | A1* | 6/2008 | Araki et al. | 315/209 R |

FOREIGN PATENT DOCUMENTS

JP    2003-216249 A    7/2003
JP    2006-339298 A    12/2006

* cited by examiner

*Primary Examiner* — Daniel D Chang
(74) *Attorney, Agent, or Firm* — Cantor Colburn LLP

(57) ABSTRACT

A soft-start circuit generates a soft-start voltage Vss having a voltage level that rises over time. A pulse width modulator generates a PWM signal having a duty ratio adjusted such that a feedback voltage Vout' that corresponds to the output voltage Vout of the switching power supply matches the soft-start voltage Vss. A driver circuit controls a switching element according to the PWM signal. A capacitor is arranged such that one terminal thereof is set to a fixed electric potential. A current source generates a charge current that flows intermittently in synchronization with the PWM signal so as to charge the capacitor. The soft-start circuit outputs, as the soft-start voltage Vss, a voltage that occurs at the capacitor.

13 Claims, 5 Drawing Sheets

(a)

(b)

CONTROL CIRCUIT FOR SWITCHING POWER SUPPLY

BACKGROUND OF THE INVENTION

1. Field of the Invention

The present invention relates to a switching power supply, and particularly to a soft-start technique for gradually raising the output voltage of the switching power supply.

2. Description of the Related Art

In order to convert a DC voltage having a given voltage level to a DC voltage having a different voltage level, a switching regulator (DC/DC converter) is employed. Such a switching regulator includes a switching element, a rectifier element, an inductor, and an output capacitor. The switching regulator is configured to stabilize the output voltage to a desired voltage level by adjusting the duty ratio of the on/off operation of the switching element.

When starting up the switching regulator, there is a need to raise the output voltage from a 0 V state, i.e., a state in which the amount of charge stored in the output capacitor is zero, to a state in which it reaches a target value. If there is a sudden increase in the output voltage, in some cases, this leads to an inrush current occurring in the output capacitor, or leads to overshoot or ringing occurring in the output voltage, which excessively raise the output voltage. In some cases, this leads to adverse effects on the reliability of the circuit elements.

Accordingly, in order to prevent such an inrush current from occurring, a soft-start circuit is provided to such a switching regulator. Such an arrangement performs a soft-start control operation so as to gradually increase the output voltage.

RELATED ART DOCUMENTS

Patent Documents

[Patent Document 1]
   Japanese Patent Application Laid Open No. 2006-339298
[Patent Document 2]
   Japanese Patent Application Laid Open No. 2003-216249

FIGS. 1A and 1B are circuit diagrams each showing a configuration of a control circuit of a switching regulator having a soft-start function. A control circuit 300a receives, as an input signal, a feedback voltage Vout' that corresponds to the output voltage Vout of the switching regulator. A reference voltage source 302 generates a predetermined reference voltage Vref. A D/A converter 304 generates a soft-start voltage Vss that gradually rises over time. An error amplifier 306 amplifies the difference between the feedback voltage Vout' and the lower of the soft-start voltage Vss and the reference voltage Vref, and generates an error voltage Verr (otherwise represented by $V_{FB}$) that corresponds to the difference. An oscillator 308 generates a cyclic signal Vosc having a predetermined frequency and having a triangular waveform or a sawtooth waveform. A PWM comparator 310 makes a comparison between the cyclic signal Vosc and the error signal Verr, and generates a pulse width modulation (PWM) signal Spwm that corresponds the comparison result. A driver 312 drives a switching element (not shown) according to the PWM signal Spwm.

With such a configuration, when the switching regulator is started up, the soft-start voltage Vss is gradually raised. Thus, the duty ratio of the PWM signal Spwm is gradually raised, thereby gradually raising the output voltage Vout. However, such an arrangement requires a D/A converter. Accordingly, such an arrangement has a problem in that the circuit area is increased.

An arrangement shown in FIG. 1B includes a current source 314 configured to generate a constant current Ic, and a capacitor C2 configured to be charged by the constant current Ic, instead of the D/A converter 304. The soft-start voltage Vss that occurs at the capacitor C2 is represented by the following Expression (1). Here, t represents the time elapsed after the capacitor C2 starts to be charged, and C2 represents the capacitance of the capacitor C2.

$$Vss = Ic/C2 \times t \qquad (1)$$

Here, Ic/C2 represents the slope of the soft-start voltage Vss curve. Accordingly, if there is a desire to increase the soft-start time, there is a need to reduce the constant current Ic or to increase the capacitance of the capacitor C2. Such a reduction in the constant current Ic leads to a problem of deterioration in the precision of the constant current Ic, resulting in a problem of irregularities in the soft-start time. On the other hand, such an increased capacitance of the capacitor C1 does not lead to such a problem in a case in which the capacitor C2 is configured as a component external to the control circuit. However, in a case in which the capacitor C2 is configured as a built-in component of the control circuit, such an arrangement has a problem of an increased circuit area.

SUMMARY OF THE INVENTION

The present invention has been made in order to solve such a problem. Accordingly, it is an exemplary purpose of the present invention to provide a control circuit for a switching regulator having a soft-start function while requiring a small circuit area.

An embodiment of the present invention relates to a control circuit configured to control a switching element of a switching power supply. The control circuit comprises: a soft-start circuit configured to generate a soft-start voltage having a voltage level that rises over time; a pulse modulator configured to generate a pulse modulation signal having a duty ratio adjusted such that a feedback voltage that corresponds to an output voltage of the switching power supply matches the soft-start voltage; and a driver circuit configured to control the switching element according to the pulse modulation signal. The soft-start circuit comprises: a capacitor arranged such that one terminal thereof is set to a fixed electric potential; and a current source configured to generate a charge current that flows intermittently in synchronization with the pulse modulation signal so as to charge the capacitor. The soft-start circuit is configured to output, as the soft-start voltage, the voltage that occurs at the capacitor.

With such an embodiment, by intermittently charging the capacitor, such an arrangement is capable of reducing the effective charge current. Thus, such an arrangement is capable of generating a soft-start voltage that has a low rate of change with respect to time, i.e., a soft-start voltage having a long time constant, even if the capacitor has a small capacitance. Thus, such an arrangement allows the capacitor to be arranged in the form of a built-in component of the control circuit.

Also, the pulse modulator may comprise: an error amplifier configured to generate an error voltage by amplifying the difference between the feedback voltage and one from among a predetermined reference voltage and the soft-start voltage; an oscillator configured to generate a cyclic signal having a predetermined frequency and having a sawtooth waveform or a triangular waveform; and a comparator configured to compare the cyclic signal with the error voltage, and to generate a pulse modulation signal having a level that corresponds to the comparison result.

Also, the pulse modulator may comprise: an error amplifier configured to generate an error voltage by amplifying the difference between the feedback voltage and a predetermined reference voltage; an oscillator configured to generate a cyclic signal having a predetermined frequency and having a sawtooth waveform or a triangular waveform; and a comparator configured to compare the cyclic signal with one selected from among the error voltage and the soft-start voltage, and to generate the pulse modulation signal having a level that corresponds to the comparison result.

Also, the soft-start circuit may further comprise a one-shot circuit configured to receive a pulse signal that is synchronization with the cyclic signal, and to generate a control pulse signal which is set to high level for a predetermined period having an edge of the pulse signal as a start point. Also, the control circuit may perform switching of the charge current according to the control pulse signal.

Also, the control circuit may further comprise a frequency divider configured to divide the frequency of the pulse signal that is synchronization with the cyclic signal. Also, the one-shot circuit may be configured to receive the pulse signal thus frequency-divided.

Also, the control circuit according to an embodiment may further comprise a clamp circuit configured to clamp the error voltage under an upper limit level that is a predetermined voltage step higher than the soft-start voltage.

With such an embodiment, by clamping the error voltage using as a reference the upper limit level that changes according to the soft-start voltage, such an arrangement provides a smooth transition from the soft-start control operation based upon the soft-start voltage to the feedback control operation based upon the feedback voltage.

Also, the clamp circuit may comprise a P-channel MOSFET arranged such that the source thereof is connected to a line for the error voltage, the drain thereof is set to a fixed electric potential, and the soft-start voltage is applied to the gate thereof.

With such an arrangement, the threshold voltage Vth of the P-channel MOSFET can be used as the predetermined voltage step.

Also, the clamp circuit may comprise a PNP bipolar transistor arranged such that the emitter thereof is connected to a line for the error voltage, the collector thereof is set to a fixed electric potential, and the soft-start voltage is applied to the base thereof.

With such an arrangement, the base-emitter forward voltage Vf of the bipolar transistor can be used as the predetermined voltage step.

Another embodiment of the present invention relates to a switching power supply. The switching power supply comprises: a switching element; an output circuit configured to boost an input voltage according to an on/off operation of the switching element; and a control circuit according to any one of the aforementioned embodiments, configured to control the switching element.

Yet another embodiment of the present invention relates to a light emitting apparatus. The light emitting apparatus comprises: a switching power supply comprising a switching element; a light emitting diode string comprising multiple light emitting diodes connected in series, and arranged such that an output voltage of the switching power supply is applied to one terminal of the light emitting diode string; a current driving circuit connected to the other terminal of the light emitting diode string, and configured to generate a driving current; and a control circuit according to any one of the aforementioned embodiments, configured to receive, as the feedback voltage, a voltage that occurs at the aforementioned other terminal of the light emitting diode string, and to control the switching element.

Yet another embodiment of the present invention relates to an electronic device. The electronic device comprises the aforementioned light emitting apparatus.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

In the present specification, the state represented by the phrase "the member A is connected to the member B" includes a state in which the member A is indirectly connected to the member B via another member that does not substantially affect the electric connection therebetween, or that does not damage the functions or effects of the connection therebetween, in addition to a state in which the member A is physically and directly connected to the member B.

Similarly, the state represented by the phrase "the member C is provided between the member A and the member B" includes a state in which the member A is indirectly connected to the member C, or the member B is indirectly connected to the member C via another member that does not substantially affect the electric connection therebetween, or that does not damage the functions or effects of the connection therebetween, in addition to a state in which the member A is directly connected to the member C, or the member B is directly connected to the member C.

Figure 2:
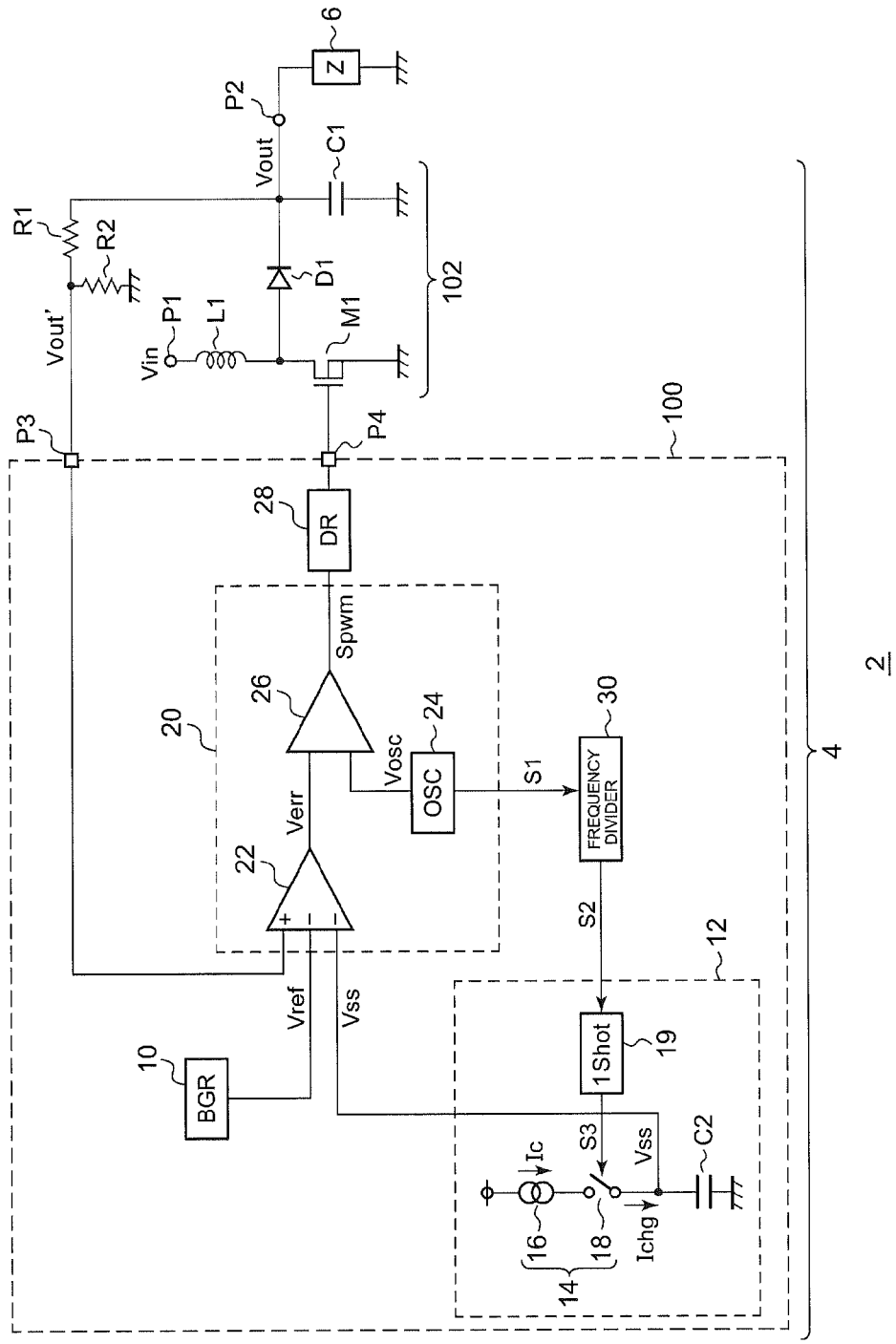
FIG. 2 is a circuit diagram which shows a configuration of an electronic device including a switching power supply according to an embodiment.

FIG. 2 is a circuit diagram showing a configuration of an electronic device including a switching power supply according to an embodiment.

Figure 1:
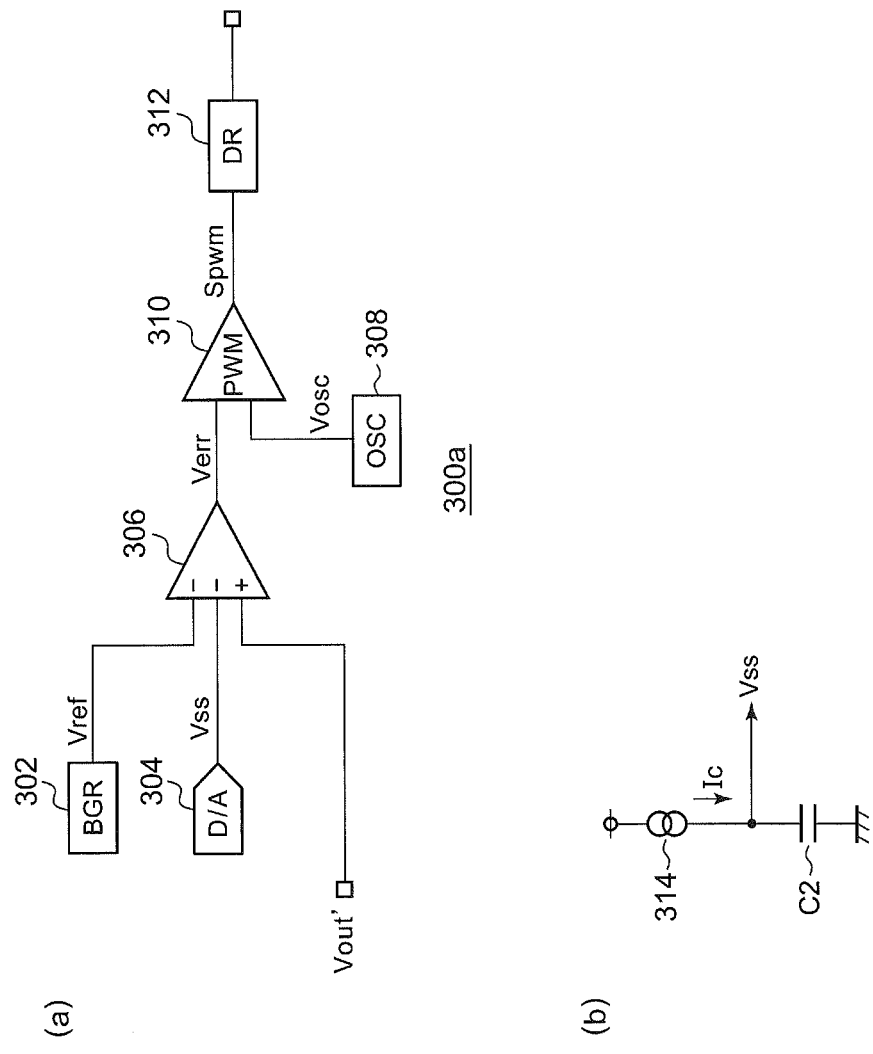
FIGS. 1A and 1B are circuit diagrams each showing a configuration of a control circuit of a switching regulator having a soft-start function.

An electronic device 2 is configured as a battery-driven device such as a laptop PC, a digital still camera, a digital video camera, a cellular phone terminal, a PDA (Personal Digital Assistant), or the like, and includes a circuit block requiring a power supply voltage that is higher than the battery voltage. Examples of such circuit blocks include a liquid crystal driver, an LED (Light Emitting Diode), etc., which are represented by a load 6 in FIG. 1.

The electronic device 2 includes a switching power supply 4 configured to supply, to the load 6, a power supply voltage that is higher than the battery voltage. The battery voltage is input as the input voltage Vin to the input terminal P1 of the switching power supply 4. The switching power supply 4 boosts the input voltage Vin, and outputs an output voltage (power supply voltage) Vout via an output terminal P2.

The switching power supply 4 is configured as a step-up DC/DC converter, and includes a control IC 100 and an output circuit 102. The output circuit 102 includes an inductor L1, a rectifier diode D1, a switching transistor M1, and an output capacitor C1. The output circuit 102 has a typical topology, and accordingly, description thereof will be omitted.

A switching terminal P4 of the control IC 100 is connected to the gate of the switching transistor M1. The control IC 100 adjusts the duty ratio of the on/off operation of the switching transistor M1 by means of a feedback control operation such that the output voltage Vout approaches the target value. It should be noted that the switching transistor M1 may be configured as a built-in component of the control IC 100.

The resistors R1 and R2 divide the output voltage Vout so as to generate a feedback voltage Vout' that corresponds to the output voltage Vout. The feedback voltage Vout' is input to a feedback terminal P3.

The control IC 100 includes a reference voltage source 10, a soft-start circuit 12, a pulse width modulator 20, and a driver 28, which are monolithically integrated on a single semiconductor substrate. Examples of "arrangements monolithically integrated" include: an arrangement in which all the elements of a circuit are formed on a single semiconductor substrate; and an arrangement in which principal elements of a circuit are monolithically integrated. Also, a part of the resistors, capacitors, and so forth, for adjusting circuit constants, may be provided as elements external to the semiconductor substrate.

The reference voltage source 10 is a so-called band gap reference circuit, which is configured to generate a reference voltage Vref on the order of 1.2 V. The soft-start circuit 12 generates a soft-start voltage Vss having a voltage level that gradually rises over time.

The pulse width modulator 20 generates a pulse width modulation (PWM) signal Spwm having a duty ratio adjusted such that the feedback voltage Vout' that corresponds to the output voltage Vout of the switching power supply 4 matches the soft-start voltage Vss. After the soft-start period ends, the pulse width modulator 20 performs a feedback control operation on the duty ratio of the PWM signal Spwm such that the feedback voltage Vout' matches the reference voltage Vref.

The pulse width modulator 20 includes an error amplifier 22, an oscillator 24, and a PWM comparator 26. The error amplifier 22 amplifies the difference between the feedback voltage Vout' and the lower of the soft-start voltage Vss and the reference voltage Vref, and generates an error voltage Verr that corresponds to the difference. The oscillator 24 generates a cyclic signal Vosc having a predetermined frequency and having a triangular waveform or a sawtooth waveform. The PWM comparator 26 makes a comparison between the cyclic signal Vosc and the error voltage Verr, and generates a pulse width modulation (PWM) signal Spwm having a level that corresponds to the comparison result. It should be noted that the configuration of the pulse width modulator 20 is not restricted in particular.

The driver 28 drives the switching transistor M1 according to the PWM signal Spwm.

The above is the overall configuration of the control IC 100. Next, description will be made regarding the configuration of the soft-start circuit 12.

The soft-start circuit 12 includes a capacitor C2, a current source 14, and a one-shot circuit 19. The capacitor C2 is arranged such that one terminal thereof is grounded, and the electric potential thereof is fixed. The current source 14 generates an intermittent charge current Ichg in synchronization with the PWM signal Spwm so as to charge the capacitor C2. The soft-start circuit 12 outputs the voltage that occurs at the capacitor C2 as the soft-start voltage Vss.

The current source 14 includes a constant current source 16 configured to generate a constant current Ic1, and a switch 18 arranged on a path for the constant current Ic. By switching on and off the switch 18, such an arrangement generates the intermittently flowing charge current Ichg.

The oscillator 24 generates a pulse signal S1 in synchronization with the cyclic signal Vosc. For example, the pulse signal S1 is a signal which is set to high level in the rising period of the cyclic signal Vosc, and is set to low level in the remaining period. A frequency divider 30 divides the frequency of the pulse signal S1, and outputs the resulting signal to the soft-start circuit 12. The soft-start circuit 12 controls the switch 18 according to the frequency-divided pulse signal S2. It should be noted that, in a case in which the frequency of the pulse signal S1 is the most suitable for switching the switch 18, the frequency divider 30 may be omitted.

The one-shot circuit 19 receives the pulse signal S2, and generates a control pulse signal S3 which is asserted (set to high level) in a predetermined period $\tau_{ON}$ having an edge of the pulse signal S2 as a start point. In the period $\tau_{ON}$ in which the control pulse signal S3 is asserted, the switch 18 is turned on, and the intermittent charge current Ichg is generated. That is to say, by providing the one-shot circuit 18, such an arrangement is capable of controlling the time ratio of the flow of the charge current Ichg. It should be noted that, in a case in which the pulse signal S2 output from the frequency divider 30 has a suitable pulse width, such a one-shot circuit 19 may be omitted.

Figure 3:
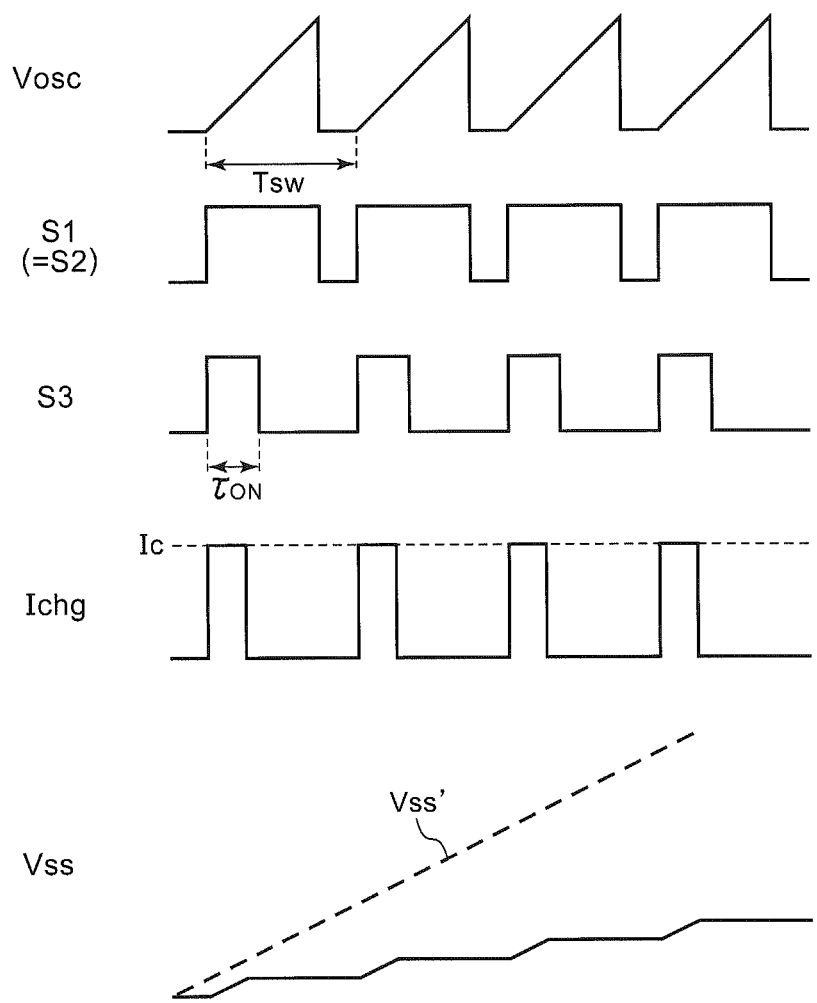
FIG. 3 is a time chart which shows the operation of a control IC shown in FIG. 2.

The above is the configuration of the control IC 100. Next, description will be made regarding the operation thereof. FIG. 3 is a time chart showing the operation of the control IC 100 shown in FIG. 2. The time chart in FIG. 3 shows a case in which the frequency division ratio is 1, i.e., a case in which the frequency divider 30 is omitted.

The soft-start voltage Vss' generated by the soft-start circuit shown in FIG. 1B is represented by the dashed line in FIG. 3. With conventional techniques, in a case in which the capacitor C2 is charged by the same constant current Ic, the soft-start voltage Vss' rises at an extremely high speed as represented by the dashed line. In order to increase the soft-start time, there is a need to reduce the slope of the soft-start voltage Vss' curve. However, such an arrangement requires the capacitor C2 to have an extremely large capacitance.

In contrast, with the control IC 100 shown in FIG. 2, the switch 18 is repeatedly turned on and off in a time divisional manner, whereby the charge current Ichg flows in a pulsed manner. The soft-start voltage Vss rises in a period in which the charge current Ichg flows, and the soft-start voltage Vss is maintained at a constant level in a period in which the charge current Ichg is cut off.

With the period of the cyclic signal Vosc, i.e., the switching period of the switching transistor M1, as $T_{SW}$, the time average Ichg' of the charge current Ichg is represented by Ichg'=Ic×$\tau_{ON}$/$T_{SW}$. If $\tau_{ON}$/$T_{SW}$ is set to be on the order of 1/20 to 1/30, the capacitance of the capacitor C2 can be 1/20 to 1/30 smaller, in comparison with the capacitance value required in a conventional arrangement.

That is to say, by providing the intermittently flowing charge current Ichg, such an arrangement provides a charge current Ichg having a reduced effective value (time averaged value). Thus, such an arrangement provides a long soft-start time even if the capacitor C2 has a small capacitance. By reducing the capacitance of the capacitor C2, such an arrangement allows the capacitor C2 to be integrated in the control IC 100, thereby providing reduced costs.

Furthermore, such an arrangement does not require a small constant current Ic in order to increase the soft-start time. Thus, such an arrangement is capable of increasing the soft-start time without involving deterioration in the precision of the constant current Ic. Thus, such an arrangement also suppresses irregularities in the soft-start time.

Figure 4:
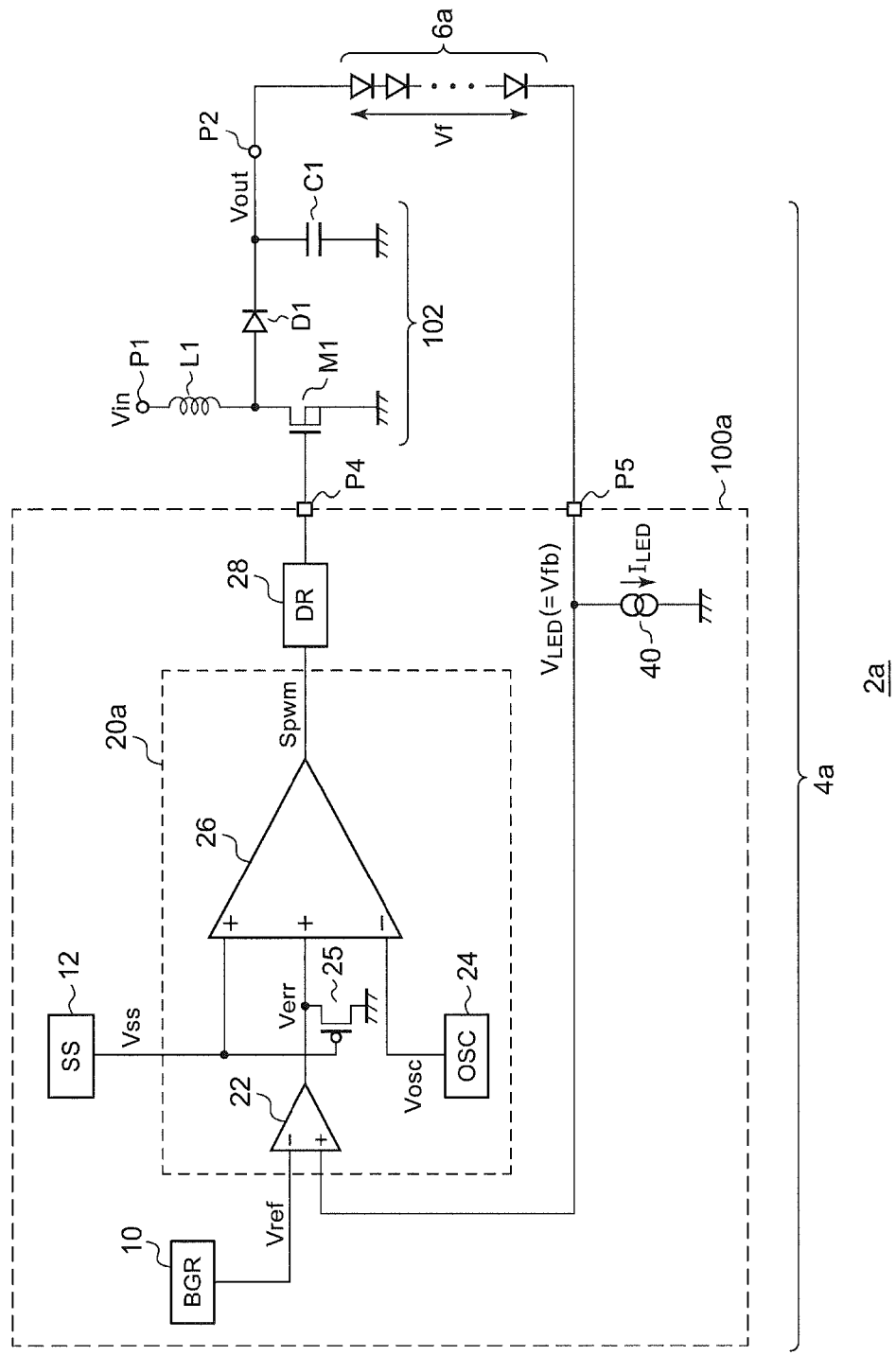
FIG. 4 is a circuit diagram which shows a configuration of an electronic device including a switching power supply according to another embodiment.

FIG. 4 is a circuit diagram showing a configuration of an electronic device including a switching power supply according to another embodiment. An electronic device 2a includes an LED string 6a which acts as a load. The LED string includes multiple LEDs connected in series. A switching power supply 4a supplies a driving voltage Vout to one terminal of the LED string. Furthermore, the switching power supply 4a generates a driving current $I_{LED}$ to be supplied to the LED string, and adjusts the luminance of the LED string 6a. The switching power supply 4a and the LED string 6a form a light emitting apparatus. The light emitting apparatus is used as an incoming alert light for a cellular phone terminal or as a backlight of a liquid crystal panel.

A control IC 100a shown in FIG. 4 includes an LED terminal P5 connected to the cathode of the LED string 6a. The control IC 100a includes a current driving circuit 40. The current driving circuit 40 generates a driving current $I_{LED}$.

The voltage $V_{LED}$=Vout−Vf occurs at the LED terminal P5, which is the voltage obtained by subtracting the forward voltage Vf of the LED string 6a from the output voltage Vout. The control IC 100a uses the electric potential $V_{LED}$ at the LED terminal P5 as the feedback voltage Vout' to control the switching transistor M1 such that the feedback voltage Vout', i.e., the electric potential $V_{LED}$, matches the reference voltage Vref.

There is a difference in the configuration between the pulse width modulator 20a shown in FIG. 4 and the pulse width modulator 20 shown in FIG. 2.

The error amplifier 22 generates the error voltage Verr by amplifying the difference between the feedback voltage Vout' and the predetermined reference voltage. The PWM comparator 26 compares the cyclic signal Vosc with either the error voltage Verr or the soft-start voltage Vss, and specifically with the lower of these voltages, and generates a PWM signal having a level that corresponds to the comparison result.

The pulse width modulator 20a further includes a clamp circuit 25. The clamp circuit 25 clamps the feedback voltage Verr under an upper limit level that is a predetermined voltage step ΔV higher than the soft-start voltage Vss.

For example, the clamp circuit 25 is configured as a P-channel MOSFET. The P-channel MOSFET is arranged such that the drain thereof is grounded and is set to a fixed electric potential, the source thereof is connected to the line of the error voltage Verr, and the soft-start voltage Vss is input to the gate thereof.

With such an arrangement, the error voltage Verr is clamped to be equal to or lower than the voltage level that is Vth higher than the soft-start voltage Vss. Here, Vth represents the gate-source threshold voltage of the MOSFET.

Also, a PNP bipolar transistor may be employed, instead of such a P-channel MOSFET. In this case, the gate, the drain, and the source, correspond to the base, the collector, and the emitter, respectively. With such an arrangement, the error voltage Verr is clamped to be equal to or lower than a voltage that is Vbe higher than the soft-start voltage Vss. Here, Vbe represents the base-emitter forward voltage of the bipolar transistor.

The above is the configuration of the control IC 100a. With such a control IC 100a, by employing the soft-start circuit 12 having the same configuration as that shown in FIG. 2, such an arrangement allows the capacitor C2 to be arranged as an internal component.

Figure 5:
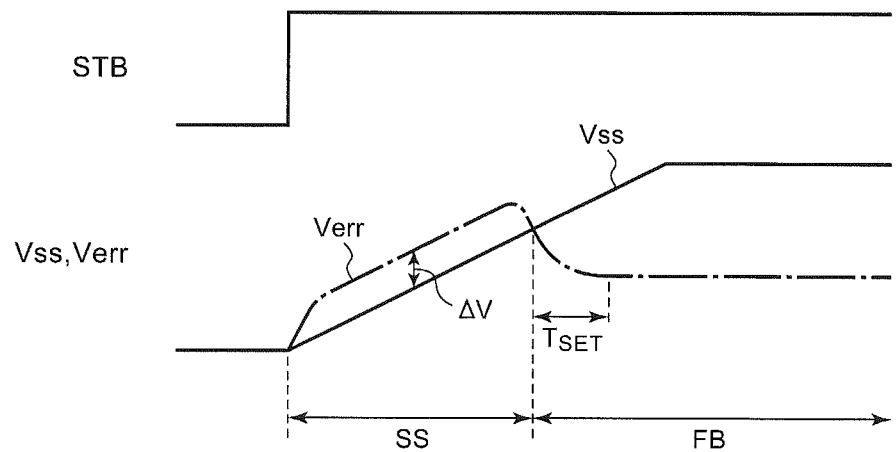
FIG. 5A is a waveform diagram which shows the operation of the control IC shown in FIG. 4.
FIG. 5B is a waveform diagram which shows the operation of an arrangement including no clamp circuit.
Figure 5:
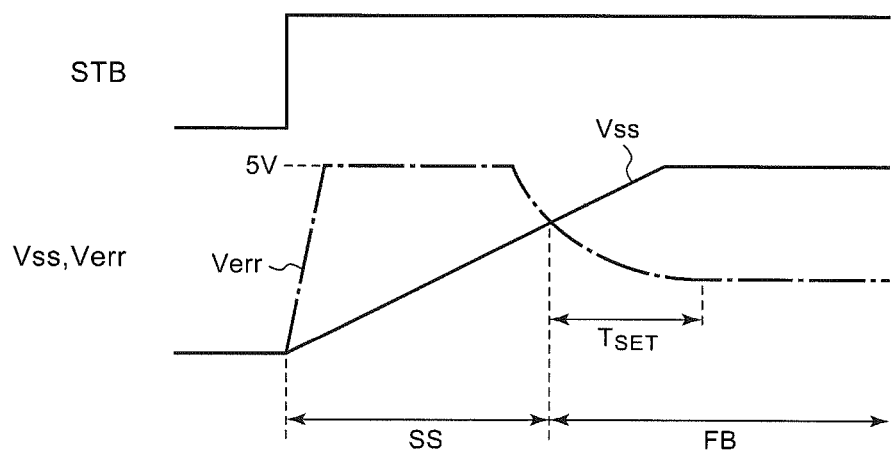

Furthermore, by providing such a clamp circuit 25, such an arrangement provides the following advantage. FIG. 5A is a waveform diagram showing the operation of the control IC 100a shown in FIG. 4, and FIG. 5B is a waveform diagram showing the operation of an arrangement that does not include such a clamp circuit 25. In order to clarify the advantage of the clamp circuit 25, description will be made with reference to FIG. 5B regarding the operation of an arrangement that does not include the clamp circuit 25.

When the standby signal STB is asserted, the control IC 100 is started up. In this stage, the soft-start operation is initiated, and the soft-start voltage Vss rises over time. The output voltage Vout of the switching power supply 4a starts to gradually rise according to an increase in the soft-start voltage Vss.

With such an arrangement that does not include the clamp circuit 25, when there is a large difference between the feedback voltage Vout' and the reference voltage Vref in the soft-start period, the error voltage Verr is fixed at the power supply voltage Vdd of the error amplifier 22 (e.g., 5 V). After the feedback voltage Vout' rises to a certain level, the error voltage Verr starts to drop. When the error voltage Verr crosses the soft-start voltage Vss, the operation mode is switched from the soft-start control operation SS to the feedback control operation FB.

As shown in FIG. 5B, due to the error voltage Verr being fixed at 5 V, which is the power supply voltage, such an arrangement requires a long settling time $T_{SET}$ (which corresponds to the period of time required for the output voltage Vout to stabilize to a target value) for the error voltage Verr to stabilize after the transition to the feedback control operation FB, which is a problem.

Next, description will be made with reference to FIG. 5A regarding the operation of the control IC 100a shown in FIG. 4. By means of the clamp circuit 25, the error voltage Verr is clamped to be equal to or lower than a voltage level that is ΔV higher than the soft-start voltage Vss. Accordingly, the error voltage Verr is not fixed at the power supply voltage 5 V, but rises according to an increase in the soft-start voltage Vss. Subsequently, when the difference between the feedback voltage Vout' and the reference voltage Vref starts to become small, the error voltage Verr starts to fall. When the soft-start voltage Vss crosses the error voltage Verr, the transition occurs from the soft-start control operation SS to the feedback control operation FB. At the timing of the transition to the feedback control operation FB, such an arrangement provides a low error voltage Verr, as compared with an arrangement that does not employ the clamp circuit 25. Thus, in such an arrangement, only a short period of time is required for the error voltage Verr to be stabilized. That is to say, by providing the clamp circuit 25, such an arrangement has an advantage of a reduced start-up time.

It should be noted that a method can be conceived in which the error voltage Verr is clamped to be equal to or lower than a fixed voltage level (e.g., 3.5 V), instead of the soft-start voltage Vss. However, such a method has the disadvantage of an error voltage Verr having a reduced dynamic range. That is to say, such a configuration shown in FIG. 4 in which the error voltage Verr is clamped with respect to the soft-start voltage has an advantage of not sacrificing the dynamic range.

Description has been made regarding the prevent invention with reference to the embodiments. The above-described embodiments have been described for exemplary purposes only, and are by no means intended to be interpreted restrictively. Rather, various modifications may be made by making various combinations of the aforementioned components or processes. Description will be made below regarding such modifications.

Description has been made in the embodiment regarding an arrangement in which the switching of the charge current Ichg is controlled according to a signal that is in synchronization with the cyclic signal Vosc. Also, the switching of the charge current Ichg may be controlled according to a signal that is not in synchronization with the cyclic signal Vosc, e.g., a clock signal supplied from an external circuit.

Description has been made in the embodiment regarding the pulse width modulators 20 and 20a configured as voltage mode pulse modulators configured to feed back the output voltage. However, the present invention is not restricted to such an arrangement. Also, various kinds of pulse modulators using other methods, such as a current mode pulse modulator or a peak current mode pulse modulator, may be employed.

Description has been made in the embodiment regarding a step-up switching power supply for exemplary purposes. Also, the present invention can be applied to a step-down switching power supply. Description has been made in the embodiment regarding a non-isolated switching power supply. Also, the present invention can be applied to an isolated switching power supply. Examples of applications of such an isolated switching power supply include an illumination control operation for a CCFL, EEFL, or the like.

The settings of the logical signals, such as the high-level state and the low-level state of the logical signals, have been described in the present embodiment for exemplary purposes only. The settings can be freely modified by inverting the signals using inverters or the like.

While the preferred embodiments of the present invention have been described using specific terms, such description is for illustrative purposes only, and it is to be understood that changes and variations may be made without departing from the spirit or scope of the appended claims.

What is claimed is:

1. A control circuit configured to control a switching element of a switching power supply, the control circuit comprising:
   a soft-start circuit configured to generate a soft-start voltage having a voltage level that rises over time;
   a pulse modulator configured to generate a pulse modulation signal having a duty ratio adjusted such that a feedback voltage that corresponds to an output voltage of the switching power supply matches the soft-start voltage; and
   a driver circuit configured to control the switching element according to the pulse modulation signal,
   wherein the soft-start circuit comprises:
      a capacitor arranged such that one terminal thereof is set to a fixed electric potential; and
      a current source configured to generate a charge current that flows intermittently in synchronization with the pulse modulation signal so as to charge the capacitor,
   and wherein the soft-start circuit is configured to output, as the soft-start voltage, the voltage that occurs at the capacitor.

2. A control circuit according to claim 1, wherein the pulse modulator comprises:
   an error amplifier configured to generate an error voltage by amplifying the difference between the feedback voltage and one from among a predetermined reference voltage and the soft-start voltage;
   an oscillator configured to generate a cyclic signal having a predetermined frequency and having a sawtooth waveform or a triangular waveform; and
   a comparator configured to compare the cyclic signal with the error voltage, and to generate a pulse modulation signal having a level that corresponds to the comparison result.

3. A control circuit according to claim 1, wherein the pulse modulator comprises:
   an error amplifier configured to generate an error voltage by amplifying the difference between the feedback voltage and a predetermined reference voltage;
   an oscillator configured to generate a cyclic signal having a predetermined frequency and having a sawtooth waveform or a triangular waveform; and
   a comparator configured to compare the cyclic signal with one selected from among the error voltage and the soft-start voltage, and to generate the pulse modulation signal having a level that corresponds to the comparison result.

4. A control circuit according to claim 2, wherein the soft-start circuit further comprises a one-shot circuit configured to receive a pulse signal that is synchronization with the cyclic signal, and to generate a control pulse signal which is set to high level for a predetermined period having an edge of the pulse signal as a start point,
   and wherein the control circuit performs switching of the charge current according to the control pulse signal.

5. A control circuit according to claim 3, wherein the soft-start circuit further comprises a one-shot circuit configured to receive a pulse signal that is synchronization with the cyclic signal, and to generate a control pulse signal which is set to high level for a predetermined period having an edge of the pulse signal as a start point,
   and wherein the control circuit performs switching of the charge current according to the control pulse signal.

6. A control circuit according to claim 4, further comprising a frequency divider configured to divide the frequency of the pulse signal that is synchronization with the cyclic signal,
   wherein the one-shot circuit is configured to receive the pulse signal thus frequency-divided.

7. A control circuit according to claim 5, further comprising a frequency divider configured to divide the frequency of the pulse signal that is synchronization with the cyclic signal,
   wherein the one-shot circuit is configured to receive the pulse signal thus frequency-divided.

8. A control circuit according to claim 3, further comprising a clamp circuit configured to clamp the error voltage under an upper limit level that is a predetermined voltage step higher than the soft-start voltage.

9. A control circuit according to claim 8, wherein the clamp circuit comprises a P-channel MOSFET arranged such that the source thereof is connected to a line for the error voltage, the drain thereof is set to a fixed electric potential, and the soft-start voltage is applied to the gate thereof.

10. A control circuit according to claim 8, wherein the clamp circuit comprises a PNP bipolar transistor arranged such that the emitter thereof is connected to a line for the error voltage, the collector thereof is set to a fixed electric potential, and the soft-start voltage is applied to the base thereof.

11. A switching power supply comprising:
a switching element;
an output circuit configured to boost an input voltage according to an on/off operation of the switching element; and
a control circuit configured to control the switching element, the control circuit comprising:
a soft-start circuit configured to generate a soft-start voltage having a voltage level that rises over time;
a pulse modulator configured to generate a pulse modulation signal having a duty ratio adjusted such that a feedback voltage that corresponds to an output voltage of the switching power supply matches the soft-start voltage; and
a driver circuit configured to control the switching element according to the pulse modulation signal,
wherein the soft-start circuit comprises:
a capacitor arranged such that one terminal thereof is set to a fixed electric potential; and
a current source configured to generate a charge current that flows intermittently in synchronization with the pulse modulation signal so as to charge the capacitor,
and wherein the soft-start circuit is configured to output, as the soft-start voltage, the voltage that occurs at the capacitor.

12. A light emitting apparatus comprising:
a switching power supply comprising a switching element;
a light emitting diode string comprising a plurality of light emitting diodes connected in series, and arranged such that an output voltage of the switching power supply is applied to one terminal of the light emitting diode string;
a current driving circuit connected to the other terminal of the light emitting diode string, and configured to generate a driving current; and
a control circuit configured to receive, as the feedback voltage, a voltage that occurs at the aforementioned other terminal of the light emitting diode string, and to control the switching element, the control circuit comprising:
a soft-start circuit configured to generate a soft-start voltage having a voltage level that rises over time;
a pulse modulator configured to generate a pulse modulation signal having a duty ratio adjusted such that a feedback voltage that corresponds to an output voltage of the switching power supply matches the soft-start voltage; and
a driver circuit configured to control the switching element according to the pulse modulation signal,
wherein the soft-start circuit comprises:
a capacitor arranged such that one terminal thereof is set to a fixed electric potential; and
a current source configured to generate a charge current that flows intermittently in synchronization with the pulse modulation signal so as to charge the capacitor,
and wherein the soft-start circuit is configured to output, as the soft-start voltage, the voltage that occurs at the capacitor,
wherein the pulse modulator comprises:
an error amplifier configured to generate an error voltage by amplifying the difference between the feedback voltage and a predetermined reference voltage;
an oscillator configured to generate a cyclic signal having a predetermined frequency and having a sawtooth waveform or a triangular waveform; and
a comparator configured to compare the cyclic signal with one selected from among the error voltage and the soft-start voltage, and to generate the pulse modulation signal having a level that corresponds to the comparison result.

13. An electronic device comprising a light emitting apparatus, the light emitting apparatus, the light emitting apparatus comprising:
a switching power supply comprising a switching element;
a light emitting diode string comprising a plurality of light emitting diodes connected in series, and arranged such that an output voltage of the switching power supply is applied to one terminal of the light emitting diode string;
a current driving circuit connected to the other terminal of the light emitting diode string, and configured to generate a driving current; and
a control circuit configured to receive, as the feedback voltage, a voltage that occurs at the aforementioned other terminal of the light emitting diode string, and to control the switching element, the control circuit comprising:
a soft-start circuit configured to generate a soft-start voltage having a voltage level that rises over time;
a pulse modulator configured to generate a pulse modulation signal having a duty ratio adjusted such that a feedback voltage that corresponds to an output voltage of the switching power supply matches the soft-start voltage; and
a driver circuit configured to control the switching element according to the pulse modulation signal,
wherein the soft-start circuit comprises:
a capacitor arranged such that one terminal thereof is set to a fixed electric potential; and
a current source configured to generate a charge current that flows intermittently in synchronization with the pulse modulation signal so as to charge the capacitor,
and wherein the soft-start circuit is configured to output, as the soft-start voltage, the voltage that occurs at the capacitor,
wherein the pulse modulator comprises:
an error amplifier configured to generate an error voltage by amplifying the difference between the feedback voltage and a predetermined reference voltage;
an oscillator configured to generate a cyclic signal having a predetermined frequency and having a sawtooth waveform or a triangular waveform; and
a comparator configured to compare the cyclic signal with one selected from among the error voltage and the soft-start voltage, and to generate the pulse modulation signal having a level that corresponds to the comparison result.

* * * * *